J. H. DANVER & W. H. LOSE.
MOLDING APPARATUS.
APPLICATION FILED DEC. 9, 1908.

924,436.

Patented June 8, 1909.
2 SHEETS—SHEET 1.

WITNESSES

INVENTORS
James H. Danver
William H. Lose,
By J. N. Cooke
Attorney.

J. H. DANVER & W. H. LOSE.
MOLDING APPARATUS.
APPLICATION FILED DEC. 9, 1908.

924,436.

Patented June 8, 1909.
2 SHEETS—SHEET 2.

WITNESSES
Walter Famariss
O. L. Thompson

INVENTORS
James H. Danver
William H. Lose
By J. N. Cooke
Attorney

UNITED STATES PATENT OFFICE.

JAMES H. DANVER, OF BEAVER, AND WILLIAM H. LOSE, OF ZELIENOPLE, PENNSYLVANIA.

MOLDING APPARATUS.

No. 924,436.   Specification of Letters Patent.   Patented June 8, 1909.

Application filed December 9, 1908. Serial No. 466,642.

*To all whom it may concern:*

Be it known that we, JAMES H. DANVER and WILLIAM H. LOSE, residents of Beaver and Zelienople, respectively, in the counties of Beaver and Butler, respectively, and State of Pennsylvania, have invented a new and useful Improvement in Molding Apparatus; and we do hereby declare the following to be a full, clear, and exact description thereof.

Our invention relates to a molding apparatus, and has special reference to a mechanism for moving the molding member of the apparatus from the mold after such mold has been formed.

The object of our invention is to provide a cheap, simple and efficient mechanism which can be applied to the part of the molding apparatus that is desired to be moved for clearance, after the mold has been formed, in order that the mold forming flask or pattern can be afterward drawn from the same, as well as such a mechanism which can easily and quickly be operated and will insure a direct line of movement at all times.

Our invention consists, generally stated, in the novel arrangement, construction and combination of parts, as hereinafter more specifically set forth and described and particularly pointed out in the claim.

To enable others skilled in the art to which the invention appertains to construct and use our improved molding apparatus, we will describe the same more fully, referring to the accompanying drawings, in which—

Figure 1:
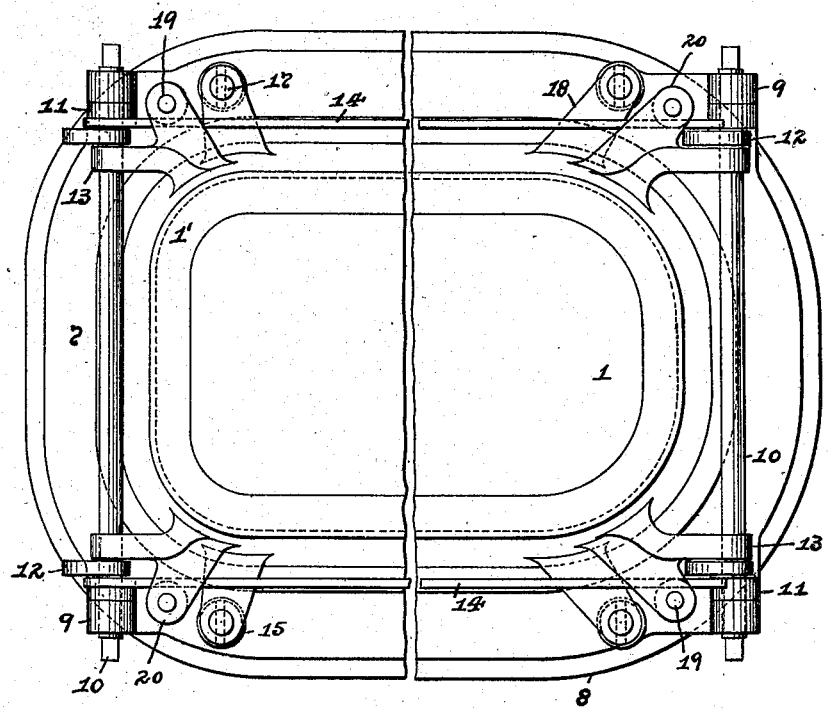
Figure 2:
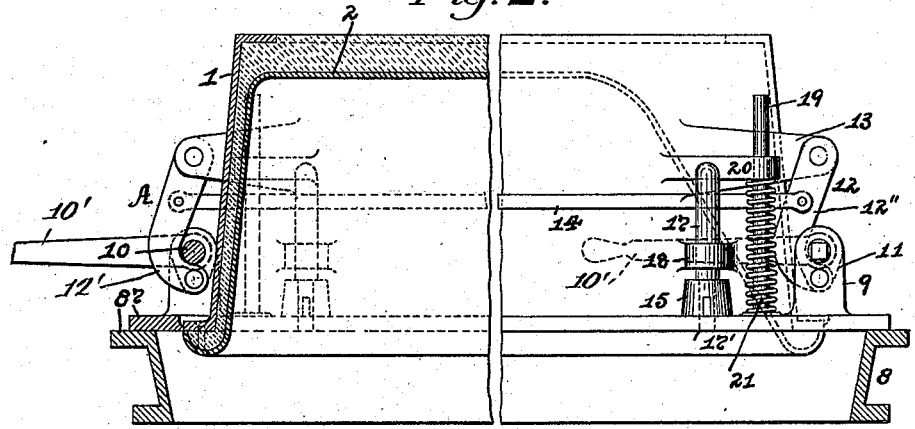
Figure 3:
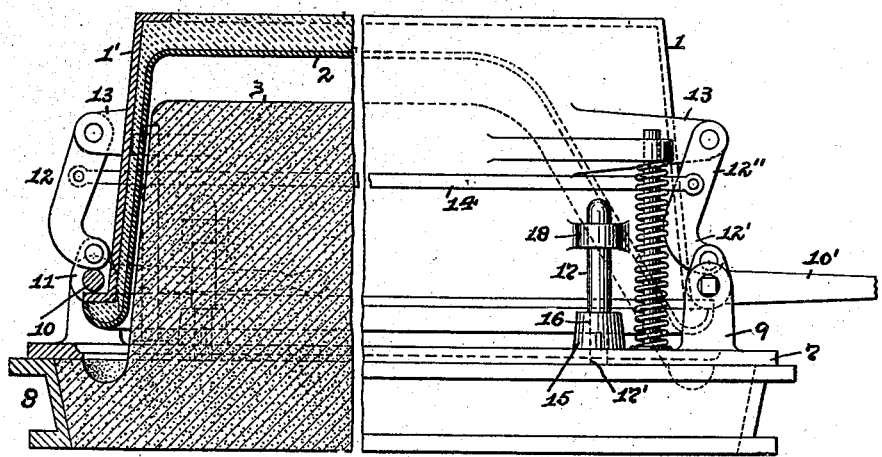
Figure 4:
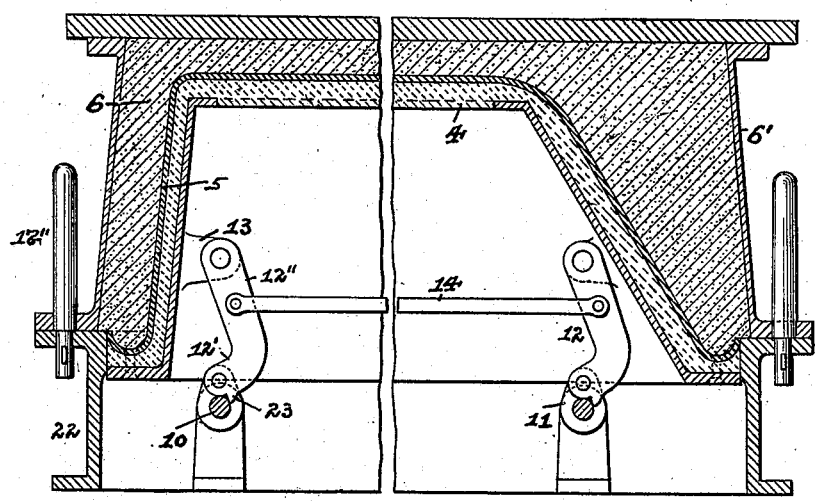

Figure 1 is a plan view of a molding apparatus employing our invention. Fig. 2 is a side view of the same partly in section showing the parts in their mold-forming position. Fig. 3 is a similar view showing the pattern raised from the mold for clearance. Fig. 4 is a longitudinal section of another form of molding apparatus, with some of the parts in full lines, and showing the invention applied to a pattern or cope machine for lowering the same for clearance of the mold.

Like symbols of reference herein indicate like parts in each of the figures of the drawings.

As illustrated in the drawings our invention is applied to a molding apparatus for the casting of bath-tubs, such as is shown in our application for a molding apparatus filed ———, in which is employed an outer pattern 1 having a hollow member 2 therein for forming the drag mold 3, an inner pattern 4, a hollow member 5 placed around the pattern 4 for forming the cope mold 6, and the stripping plate 7 resting upon the drag flask 8.

In Figs. 1, 2 and 3, the mechanism for moving the apparatus is applied as a lifting device A for the outer pattern 1 and is mounted exteriorly of the same in the following manner. Extending up from the stripping plate 7 on the flask 8 and at each end of the same are the lugs 9, within which are mounted the two cross-shafts 10, so that each of said shafts extend along each end of said plates and pattern 1, and each have a lever 10' at one of their ends.

Mounted on the shafts 10 are the arms 11 which are keyed to said shafts at one end and their opposite ends are pivoted to the ends of the short curved arms 12' on the L-shaped links 12. These links 12 are pivotally hung at the ends of their long arms 12'' to the lugs 13, which project out from the ends of the casing 1' forming part of the pattern 1, and a rod 14 extends along each side of said casing and is pivotally connected at its ends to the long arms of said links.

Extending up from each side of the stripping plate 7 are the two bosses 15 which are provided with a seat 16 therein for the reception of the contracted ends 17' on the dowel pins 17, and these pins are adapted to pass through lugs 18 on the casing 1' of the pattern 1 and guide said pattern to place when said pattern is lowered to place on the flask 8 to form the drag mold 3. On the outer side of each of the pins 17 and adjacent to the lugs 9 is a post 19 which extends up from and is secured to the stripping plate 7. These posts pass through lugs 20 formed on the ends of the pattern casing 1' and are provided with springs 21 held on the same and bearing against the under faces of said lugs for cushioning the pattern 1 when it is lowered on the flask 8.

The operation of our improved molding apparatus is as follows—When the outer pattern 1 is being lowered down onto the drag-flask 8 to form the drag-mold 3, the lifting device A is in the position shown in Fig. 3, and the said pattern will be guided to place by the pins 17 on the plate 7 passing through the lugs 18 on the casing 1' of said pattern and the posts 19 on said plate passing through the lugs 20 on said casing, so that when said pattern has been lowered to place on said flask, such as is shown in Fig. 2, it can be securely held in such position by the operators throwing the levers 10' from their positions shown in said Fig. 3 to the positions shown in Fig. 2. By this movement of the levers 10' the shafts 10 will be turned and with them the arms 11 on said shafts, which will be thrown from their positions above said shafts, as shown in Fig. 3 to their vertical positions below said shafts, as shown in Fig. 2, and thereby draw down the links 12 connected to said arms and connected together by the rods 14, so that the pivoted ends of short curved arms 12' on said links will come under and pass the center of said shafts, which will enable said arms to fit around said shafts and engage therewith to firmly set and lock the pattern 1 in position in the plate 7 and on the flask 8 for the making of the mold 3.

After the mold 3 has been made and it is desired to remove the pattern 1 therefrom, the operators throw the levers 10' of the lifting device A to the positions shown in Fig. 3, which will act to turn the shafts 10 in a reverse direction from that just described, so that the arms 11 will be thrown to a vertical position above said shafts and with them the pivoted ends of the curved arms 12' on the links 12, thereby raising said links and with them said pattern 1. By this operation of the lifting device A, the pattern 1 will clear the mold 3, as shown in Fig. 3, and thereby permit said device, pattern and plate 7 to be elevated from around said mold by the usual crane or other devices and carried to any suitable point for another operation.

When the pattern 1 is being lowered into position upon the flask 8 for forming the mold 3, the springs 21 on the posts 19 will act to cushion said pattern to position by engaging with the lugs 20 on said pattern, and during the raising of said pattern from said mold after such mold is formed said spring will assist the easy starting of said pattern in such raising operation through the lifting device A.

In Fig. 4 the lifting device A is shown as applied to the inner pattern 4 for forming the cope mold 6 around the same by the hollow member 5, in which such device has its links 12 connected together by the rods 14 and to lugs 13 within said pattern, while the short arms 12' on said links are pivoted to the arms 11 mounted on the shafts 10 which are supported below said pattern and in a supporting flask or member 22 for the cope mold, flask 6' and carrying the dowel pins 17'' for the guiding of the said flask 6'. In this case, the arms 12' on the links 12 when raised by the raising of the arms 11 to their upper vertical position through the shafts 10, will raise the pattern 4 and member 5 through said links, to form the mold 6, and after said mold is formed a reverse movement of said shafts will draw down the arms 11 to their lower vertical position and lower the arms 12' on said links, so that said links will draw down the said pattern and member to clear said mold and permit said mold to be elevated from around said pattern and member in the usual manner and carried to the point desired. If desired, the arms 12' on the links 12 can be provided with lugs 23 for engaging the shafts 10 to assist in holding the arms 11 in their raised positions for the setting and locking of the pattern 4 and member 5 during the forming of the mold 6.

Various other modifications and changes in the design, construction and operation of our improved molding apparatus may be resorted to without departing from the spirit of the invention or sacrificing any of its advantages.

It will thus be seen that in the use of our improved molding apparatus the pattern will clear the mold in a direct line at all times, and during the formation of the mold by the pattern such pattern will be held firmly in position for such operation, as well as being securely locked when in such position. The device for moving the pattern for clearance of the mold can be easily and conveniently operated by hand, will not get out of order and can be applied to any flask or pattern wherein it is desired to move the same for cleaning the mold or for such other purpose as would be desired.

What we claim as our invention, and desire to secure by Letters Patent, is—

In a molding apparatus, the combination with a molding pattern, of shafts carried by said pattern and having arms thereon, L-shaped links connected to the pattern and to said arms for moving said pattern to relieve the same from the mold, said links being adapted to engage with said shafts to lock said pattern in its withdrawn position, and lugs on said links for engaging with said shafts to hold said links in working position.

In testimony whereof, we, the said JAMES H. DANVER and WILLIAM H. LOSE, have hereunto set our hands.

JAMES H. DANVER.
WILLIAM H. LOSE.

Witnesses:
J. L. TREFELLER, Jr.,
J. N. COOKE.